US011316171B2

(12) United States Patent
Cheng et al.

(10) Patent No.: US 11,316,171 B2
(45) Date of Patent: Apr. 26, 2022

(54) CONDUCTIVE, ANTI-CORROSIVE MAGNESIUM TITANIUM OXIDE MATERIAL

(71) Applicant: Robert Bosch GmbH, Stuttgart (DE)

(72) Inventors: Lei Cheng, Sunnyvale, CA (US); Jonathan Mailoa, Cambridge, MA (US); Soo Kim, Cambridge, MA (US); Mordechai Kornbluth, Brighton, MA (US); Dawei Zhang, La Jolla, CA (US); Nathan Craig, Santa Clara, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 219 days.

(21) Appl. No.: 16/675,538

(22) Filed: Nov. 6, 2019

(65) Prior Publication Data

US 2021/0135252 A1 May 6, 2021

(51) Int. Cl.
*H01M 8/0228* (2016.01)
*H01M 8/0206* (2016.01)
*H01M 8/0217* (2016.01)

(52) U.S. Cl.
CPC ....... *H01M 8/0228* (2013.01); *H01M 8/0206* (2013.01); *H01M 8/0217* (2013.01)

(58) Field of Classification Search
CPC ............. H01M 8/0206; H01M 8/0217; H01M 8/0228; Y02E 60/50
See application file for complete search history.

(56) References Cited

U.S. PATENT DOCUMENTS

| | | | |
|---|---|---|---|
| 5,180,285 A * | 1/1993 | Lau | C23C 28/00 416/241 B |
| 5,942,348 A * | 8/1999 | Jansing | H01M 8/0273 429/496 |
| 5,958,616 A | 9/1999 | Salinas et al. | |
| 7,736,791 B1 * | 6/2010 | Merz | H01M 50/409 429/51 |
| 8,062,552 B2 | 11/2011 | Adzic et al. | |
| 9,048,465 B2 | 6/2015 | Bang et al. | |
| 9,579,636 B1 | 2/2017 | Roy et al. | |
| 9,742,010 B2 | 8/2017 | Ho et al. | |
| 2006/0263675 A1 | 11/2006 | Adzic et al. | |
| 2012/0264027 A1 * | 10/2012 | Mizukami | H01M 4/92 429/427 |

(Continued)

OTHER PUBLICATIONS

Suzuki, Yoshikazu et al., "Magnesium Dititanate (MgTi2O5) with pseudobrookite structure: a review", Science and Technology of Advanced Materials, 12 (2011) 034301. 6 pages.

(Continued)

*Primary Examiner* — Miriam Stagg
*Assistant Examiner* — Rachel L Zhang
(74) *Attorney, Agent, or Firm* — Brooks Kushman P.C.

(57) ABSTRACT

A fuel cell bipolar plate (BPP) includes a metal substrate having a bulk portion and a surface portion comprising an anticorrosive, conductive material having oxygen vacancies and a formula (I):

$$MgTi_2O_{5-\delta} \qquad (I),$$

where $\delta$ is any number between 0 and 3 optionally including a fractional part denoting the oxygen vacancies, the material having an electronic conductivity of about 2-10 S/m at room temperature in an ambient environment.

15 Claims, 8 Drawing Sheets

(56) References Cited

U.S. PATENT DOCUMENTS

2013/0040129 A1    2/2013  Jin et al.
2015/0354072 A1*  12/2015  Suchsland ........... H01M 4/8605
                                                           429/480
2017/0314141 A1   11/2017  Xu

OTHER PUBLICATIONS

Isobe, Masahiko et al., "Synthesis, Structure and Physical Properties of Spinel Solid Solutions Mg2TiO4—Mg—Ti2O4", Journal of Alloys and Compounds 383 92004) pp. 85-88. 5 pages.
Tanaka, Yasuo, "Studies on the Reactions Between Oxides in Solid State at Higher Temperatures. I. The Reaction between Magnesium Oxide and Titanium Oxide.", Bulletin of the Chemical Society of Japan, 1941, vol. 16, No. 11, pp. 428-441. 15 pages. https://www.journal.csj.jp/doi/abs/10.1246/bdsj.16.428.
Davies, J.C. et al., "Stabilising Oxide Core-Platinum Shell Catalysts for the Oxygen Reduction Reaction," Electrochimica Acta 248 (2017) 470-477. 8 Pages.
Bandura, A.V. et al., "Comparisons of Multilayer H2O Adsorption onto the (110) Surfaces of α-TiO2 and SnO2 as Calculated with Density Functional Theory", J. Phys. Chem. B 112 (2008) 11616. 9 Pages.
Wikipedia, https://en.wikipedia.org/wiki/Segration (materials science) (Year 2020).

\* cited by examiner

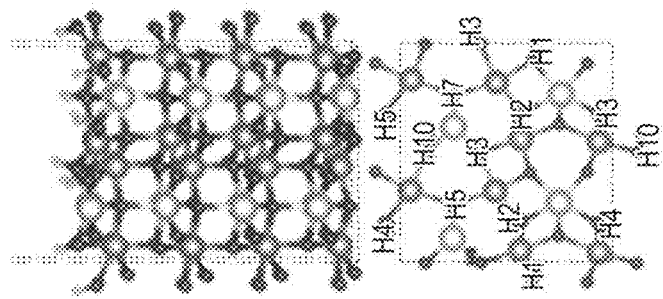
FIG. 5A MgTi$_2$O$_5$
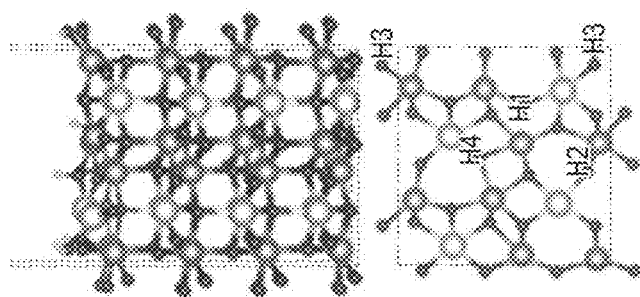
FIG. 5B MgTi$_2$O$_{5-\delta}$
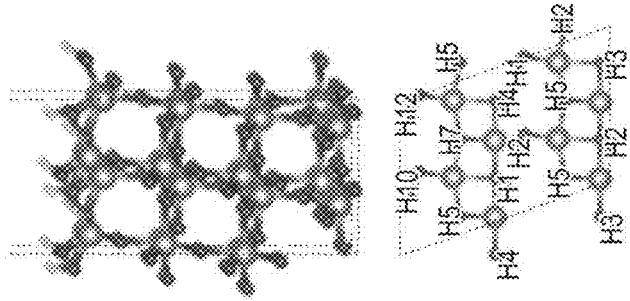
FIG. 5C TiO$_2$ (anatase)
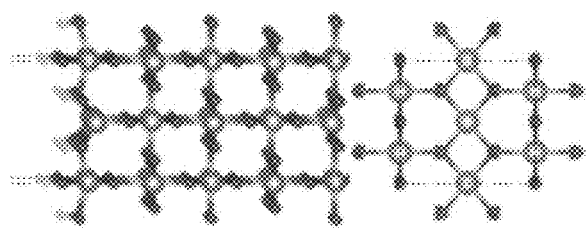
FIG. 5D TiO$_2$ (rutile)
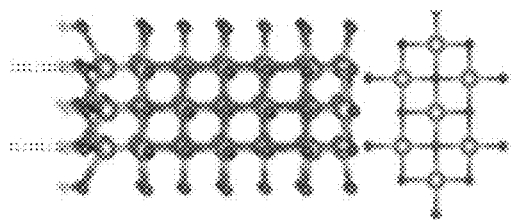
FIG. 5E TiO
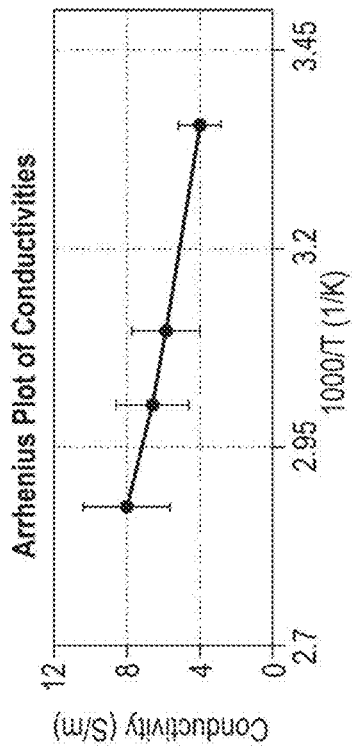
FIG. 6

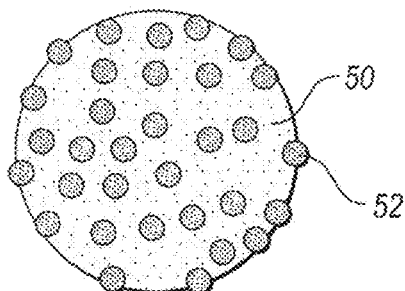
FIG. 11A
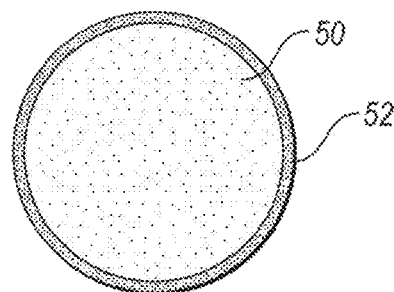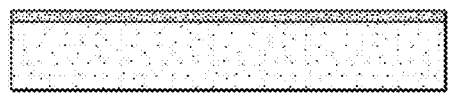
FIG. 11B
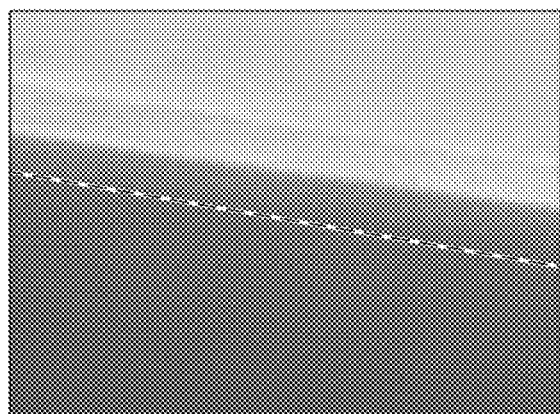
FIG. 12A
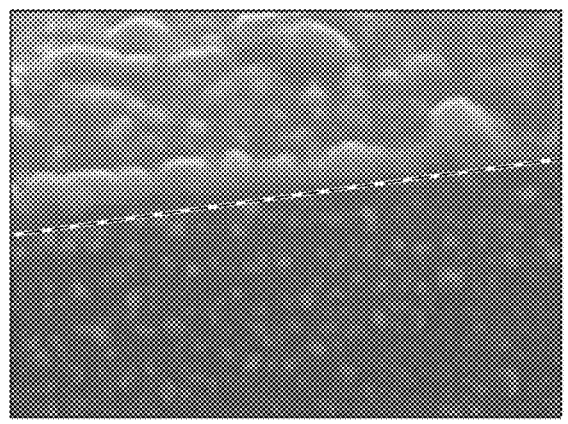
FIG. 12B

CONDUCTIVE, ANTI-CORROSIVE MAGNESIUM TITANIUM OXIDE MATERIAL

TECHNICAL FIELD

The present disclosure relates to an anti-corrosive, electrically conductive magnesium titanium oxide material with oxygen vacancies.

BACKGROUND

Metals have been a widely used material for thousands of years. Various methods have been developed to preserve metals and prevent their corrosion or disintegration into oxides, hydroxides, sulfates, and other salts. Metals in some industrial applications are especially susceptible to corrosion due to aggressive operating environments. Non-limiting examples may be metal components of a fuel cell such as a bipolar plate (BPP) or a fuel cell's catalyst support material. In addition, certain components such as the BPP are required to not only be sufficiency chemically inert to resist degradation in the highly corrosive environment of the fuel cell, but also be electrically conducting to facilitate electron transfer for the oxygen reduction reaction of the fuel cell. Finding a material that meets both the requirements has been a challenge.

SUMMARY

According to one embodiment, a fuel cell BPP is disclosed. The BPP includes a metal substrate having a bulk portion and a surface portion comprising an anticorrosive, conductive material having oxygen vacancies and a formula (I):

$$MgTi_2O_{5-\delta} \qquad (I),$$

where $\delta$ is any number between 0 and 3 optionally including a fractional part denoting the oxygen vacancies. The material may have an electronic conductivity of about 2-10 S/m at room temperature in an ambient environment. A static corrosion current density of the bipolar plate may be less than about 1 µA cm$^{-2}$ at pH of 2 at a temperature of about 0 to 80° C. An Mg/Ti ratio of the material may be a number in a range between 0.3 to 0.6. The material may have an activation energy of about 0.13 eV in a temperature range between 25° C. to 80° C. $\delta$ may include the fractional part. The material may be non-stoichiometric. The material may have a crystalline structure. The structure may include at least one Ti atom with five bonds to oxygen atoms.

In an alternative embodiment, a proton-exchange-membrane fuel cell BPP is disclosed. The BPP may include a metal substrate having a bulk portion and a surface portion either one of which includes an anticorrosive, conductive material having oxygen vacancies and a formula (I):

$$MgTi_2O_{5-\delta} \qquad (I),$$

where $\delta$ is any number between 0 and 3 optionally including a fractional part and denoting oxygen vacancies. The material may have a nominal chemical composition of about 33 mol % MgO and 66 mol % of a mixture of TiO and TiO$_2$. An Mg/Ti ratio may be a number in a range between 0.3 to 0.6. $\delta$ may include the fractional part. A static corrosion current density of the bipolar plate may be less than about 1 µA cm$^{-2}$ at pH of 2 at a temperature of about 0 to 80° C. The material may have an activation energy of about 0.13 eV in a temperature range between 25° C. to 80° C. The bulk portion may include the material. The material may be non-stoichiometric.

In yet another embodiment, a fuel cell is disclosed. The fuel cell may include a BPP having a metal substrate including a bulk portion and a surface portion comprising an anticorrosive, conductive material having oxygen vacancies and a formula (I):

$$MgTi_2O_{5-\delta} \qquad (I),$$

where $\delta$ is any number between 0 and 3 optionally including a fractional part denoting the oxygen vacancies. The material may have an electronic conductivity of about 2-10 S/m at room temperature in ambient environment. Static corrosion current density of the bipolar plate may be less than about 1 µA cm$^{-2}$ at pH of 2 at a temperature of about 0 to 80° C. An Mg/Ti ratio of the material may be a number in a range between 0.3 to 0.6. The fuel cell may be an anion exchange membrane fuel cell (AEMFC). $\delta$ may include the fractional part.

BRIEF DESCRIPTION OF THE DRAWINGS

FIGS. 5A through 5E show chemical structures of (110) MgTi$_2$O$_5$, (110) MgTi$_2$O$_{5-\delta}$, (101) TiO$_2$ (anatase), (110) TiO$_2$ (rutile), and (001) TiO;

FIG. 6 shows an Arrhenius plot of conductivities from 25° C. to 80° C. for MgTi$_2$O$_{5-\delta}$;

FIGS. 11A and 11B show schematic depictions of MgTi$_2$O$_{5-\delta}$ as a catalyst support material with a catalyst being deposited as islands or in a core-shell structure, respectively;

FIGS. 12A and 12B are scanning electron microscope (SEM) cross-section images of Pt being sputtered on a non-limiting example of a MgTi$_2$O$_{5-\delta}$ pellet before and after annealing;

DETAILED DESCRIPTION

Figure 1:
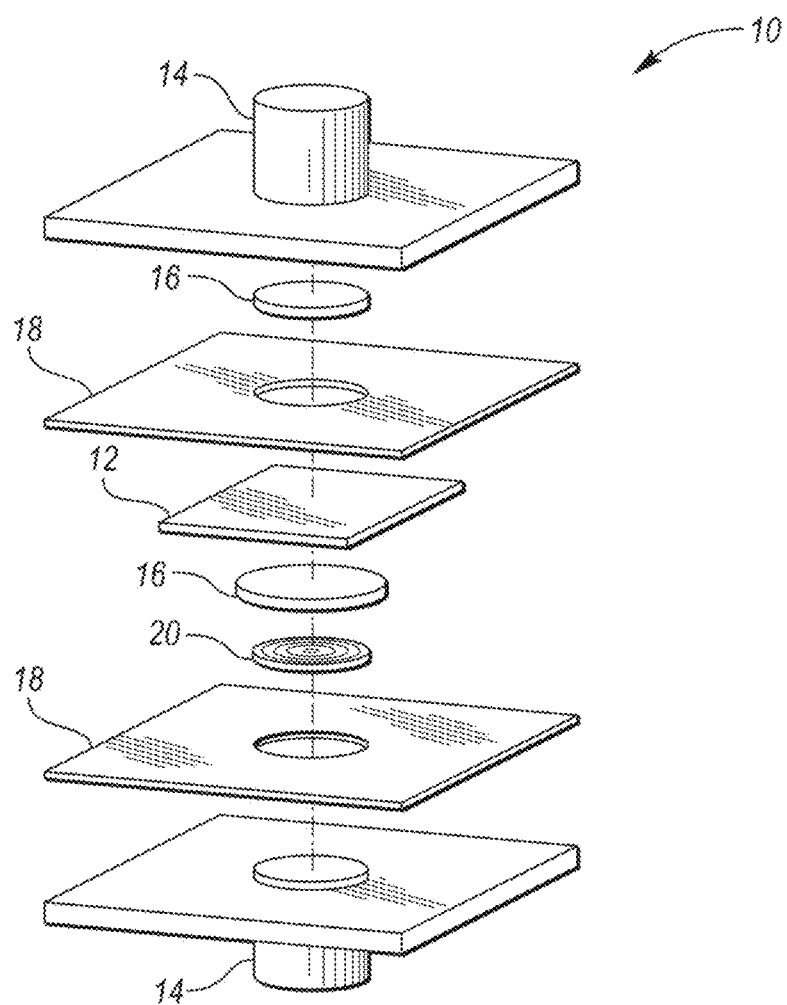
FIG. 1 depicts a schematic composition of a proton-exchange-membrane fuel cell including a bipolar plate according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Metals present a widely used group of materials in numerous industries including automotive, construction, home appliances, tools, pipes, railroad tracks, coinage, etc. Metals have been utilized for thousands of years and have remained a material of choice for certain applications due to their properties such as strength and resilience. Yet, corrosion of metals is a major source of fatigue and lifetime limitations for a number of applications using metals.

Corrosion is a natural process which converts a refined metal to a more chemically-stable form such as the metal's oxide(s), hydroxide(s), sulfide(s), and/or other salts. The conversion presents a gradual destruction of the metal material caused by electrochemical oxidation of the metal in a reaction with an oxidant such as oxygen or sulfates. Corrosion may be invoked by exposure of the metal substrate to moisture in the air, to a solution with a relatively low pH, various chemical substances such as acids, microbes, elevated temperatures, and/or other factors. Especially in acidic environments, corrosion starts at the interface between a bulk metal material (e.g., steel) and a solution (e.g., ions dissolved in water or water surface layer which react to degrade the bulk material).

Many efforts have been made to prevent or slow down corrosion of metals. For instance, various types of coatings have been developed. Example coatings include applied coatings such as paint, plating, enamel; reactive coatings including corrosion inhibitors such as chromates, phosphates, conducting polymers, surfactant-like chemicals designed to suppress electrochemical reactions between the environment and the metal substrate, anodized surfaces, or biofilm coatings. Other methods of corrosion prevention include controlled permeability framework, cathodic protection, or anodic protection.

Yet the most popular solution to the corrosion problem remains to be fortifying of the vulnerable metal surface with a coating. Most corrosion-resistant surfaces thus include one or more chemically inert coatings or protective layers that can slow down and/or at least partially prevent corrosion from occurring. Still, it has remained a challenge to find a material with substantial anticorrosion properties which would be also friendly to the environment, economical, while having superb performance characteristics.

Moreover, some applications are highly susceptible to corrosion due to their environmental factors. A non-limiting example of such application are proton-exchange-membrane fuel cells (PEMFC). The PEMFC represents an environmental-friendly alternative to internal combustion engines for a variety of vehicles such as cars and buses. The PEMFC typically features a relatively high efficiency and power density. A very attractive feature of the PEMFC engine are no carbon emissions, provided that the hydrogen fuel has been gained in an environmentally-friendly manner. Besides being a green engine, the PEMFC may be used in other applications such as stationary and portable power sources.

The PEMFC's own operating environment lends itself to corrosion for a variety of reasons. For example, low voltages exist between startups and shutdowns of the PEMFC, PEMFC has a strongly acidic environment, fluorine ions are released from the polymer membrane during operation of the PEMFC, both $H_2$ and $O_2$ exist at the anode during the startup and shutdown which causes high cathodic potential yielding cathodic corrosion, fuel crossover of hydrogen or oxygen from the anode to cathode or vice versa, etc. The PEMFC thus requires durable components capable of withstanding the above-mentioned conditions.

A non-limiting example of a PEMFC is depicted in FIG. 1. A core component of the PEMFC 10 that helps produce the electrochemical reaction needed to separate electrons is the Membrane Electrode Assembly (MEA) 12. The MEA 12 includes subcomponents such as electrodes, catalysts, and polymer electrolyte membranes. Besides MEA 12, the PEMFC 10 typically includes other components such as current collectors 14, gas diffusion layer(s) 16, gaskets 18, and bipolar plate(s) 20.

The bipolar plates or BPP 20 are implemented in a PEMFC stack to distribute gas, collect current, and separate individual cells in the stack from each other. The BPP 20 also provides additional functions such as removal of reaction products and water as well as thermal management within the PEMFC 10. The BPP 20 is also a relatively expensive component and a frequent reason for degradation of the PEMFC system. For example, BPPs may constitute about 60-80% of the stack weight, about 50% of the stack volume, and about 25-45% of the stack cost. To keep the cost low, the BPP 20 is typically made from metal, for example steel such as stainless steel. Alternative materials such as aluminum or titanium may be used. As the metal plates are susceptible to corrosion within the PEMFC system, efforts have been made to prevent the corrosion.

Additionally, in the PEMFC 10, the BPP 20 presents yet another material challenge as the BPP 20 is also required to be electrically conducting to facilitate electron transfer for the oxygen reduction reaction. Therefore, the BPP 20 material needs to be electrically conducting but chemically inert to reactions with ions present in the PEMFC 10 environment.

Typically, the BPP metal surface contains a coating such as graphite-like coating or protective oxide or nitride coatings to increase corrosion resistance of the BPP 20. The BPP's 20 surface may thus include elements such as Fe, Cr, Ni, Mo, Mn, Si, P, C, S, F, or a combination thereof. Alternative coatings include Ti alloy, doped $TiO_x$, $Cr_2O_3$, $TiO_2$, TiN, CrN, or ZrN. Yet, in an aggressively corrosive environment such as in the PEMFC 10, where coatings are more likely to degrade faster than in other applications, a need remains for a coating or material that would be economically feasible, corrosion resistant, protective against acids such as HF at PEMFC operating temperature of about 80° C., electrically conductive, and capable of forming a coherent interface (i.e., a small interfacial contact resistance) with the metal substrates at the same time.

The material disclosed herein solves one or more problems described above and/or provides the benefits identified herein. It was surprisingly discovered that the disclosed material provides anticorrosive, conductive properties to a substrate such as the BPP metal substrate. The material encompasses a variety or a series of Mg—Ti compounds with different contents of oxygen vacancies or, in other words, Mg—Ti compounds with a variety of oxygen-deficient stoichiometries.

Figure 2:
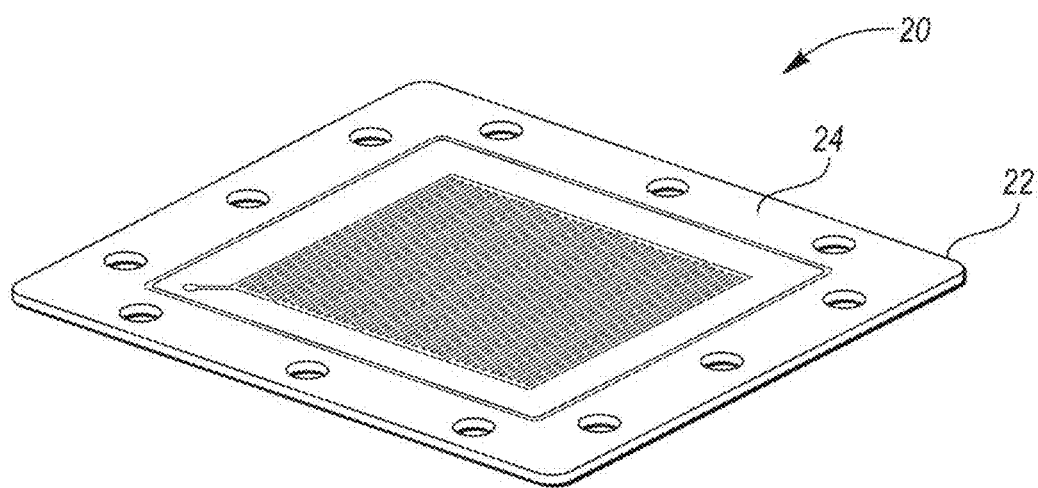
FIG. 2 shows a perspective view of a non-limiting example of a bipolar plate having a bulk portion and a surface portion including an anticorrosive and electrically conductive material according to one or more embodiments.

A non-limiting example of a BPP 20 is shown in FIG. 2. The BPP 20 represents a non-limiting example of a substrate having a solid body or bulk portion 22 and a surface portion 24. The bulk portion 22 may be formed from a metal such as steel, stainless steel, aluminum, copper, an alloy of two or more metals, the like, or a combination thereof. Alternatively, the bulk portion 22 may be formed from a composite material such as carbon-carbon composite, or carbon-polymer composite. Alternatively still, the bulk portion 22 may be made from graphite or another carbon allotrope. In another embodiment, the bulk portion 22 may also include the disclosed material.

The surface portion 24 may include the anticorrosive, chemically inert, electrically conductive, and thermodynamically stable material disclosed herein. The entire area of the surface portion 24 may include the material. Alternatively, the surface portion 24 may include one or more subportions which are free from the material. In an example embodiment, the entire surface portion 24 may include the material such that the entire BPP 20 is protected against corrosion. In other applications such as non-BPP applications, only a small portion of the surface portion 24 may include the material such as less than about ½, ¼, ⅛, ⅟₁₆, ⅟₃₂, or the like of the surface portion may include the material.

The surface portion 24, the bulk portion 22, or both may include one or more layers of the disclosed material. The material thickness on the surface portion 24 may be adjusted according to the needs of a specific application. A non-limiting example of the material layer thickness may be about 0.1 to 0.8 μm, 0.2 to 0.6 μm, or 0.3 to 0.5 μm. Alternatively, the material may be layered to form a relatively thick deposit with dimensions of more than 1 μm on the surface portion 24 such as about or at least about 1.25, 1.5, 1.75, 2.0, 2.25, 2.5, 2.75, 3.0, 3.25, 3.5, 3.75, 4.0, 4.25, 4.5, 4.75, 5.0, 10, 15, 20, 25, 30, 35, 40, 45, 50, 55, 60, 65, 70, 75, 80, 85, 90, 95, 100, 110, 120, 130 140, 150, 200, 250 μm or about 1.25, 1.5, 1.75, 2.0, 2.25, 2.5, 2.75, 3.0, 3.25, 3.5, 3.75, 4.0, 4.25, 4.5, 4.75, 5.0, 10, 15, 20, 25, 30, 35, 40, 45, 50, 55, 60, 65, 70, 75, 80, 85, 90, 95, 100, 110, 120, 130 140, 150, 200, 250, 300, 350, 400, 450, or 500 nm. The material may form one or more layers or a plurality of layers on the bulk portion 22. The material may form 1, 2, 3, 4, 5, 6, 7, 8, 9, 10, or more layers on the bulk portion 22. Each layer may have a thickness within the nanoscale or microscale recited herein with respect to the thickness of the surface portion 24.

The disclosed material is a Mg—Ti—O-based material. The disclosed material has a formula (I):

$$MgTi_2O_{5-\delta} \qquad (I),$$

where

δ is any number between 0 and 3 optionally including a fractional part such as decimals and/or hundredths and denotes oxygen vacancies. δ may be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. δ may be any number between 0 and 3 including tenths, hundredths, or both. δ may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.0, 2.01, 2.02, 2.03, 2.04, 2.05, 2.06, 2.07, 2.08, 2.09, 2.1, 2.11, 2.12, 2.13, 2.14, 2.15, 2.16, 2.17, 2.18, 2.19, 2.20, 2.21, 2.22, 2.23, 2.24, 2.25, 2.26, 2.27, 2.28, 2.29, 2.30, 2.31, 2.32, 2.33, 2.34, 2.35, 2.36, 2.37, 2.38, 2.39, 2.40, 2.41, 2.42, 2.43, 2.44, 2.45, 2.46, 2.47, 2.48, 2.49, 2.50, 2.51, 2.52, 2.53, 2.54, 2.55, 2.56, 2.57, 2.58, 2.59, 2.60, 2.61, 2.62, 2.63, 2.64, 2.65, 2.66, 2.67, 2.68, 2.69, 2.70, 2.71, 2.72, 2.73, 2.74, 2.75, 2.76, 2.77, 2.78, 2.79, 2.80, 2.81, 2.82, 2.83, 2.84, 2.85, 2.86, 2.87, 2.88, 2.89, 2.90, 2.91, 2.92, 2.93, 2.94, 2.95, 2.96, 2.97, 2.98, 2.99, or 3.00.

δ may be a range including any number named above while excluding at least one number mentioned above. For example, δ may equal 0.1 to 3.0 with the exclusion of 1 and 2. In an alternative example, δ may include one or more ranges of 0.1 to 0.9, 1.1 to 1.9, or 2.1 to 2.9. In a yet another non-limiting example, δ may include one or more ranges of 0.01 to 0.99, 1.10 to 1.99, or 2.10 to 2.99.

In one or more embodiments, the oxygen vacancies within the material contribute to beneficial properties of the material. Thus, the oxygen vacancies are formed and preserved on purpose, and processes which would eliminate presence of oxygen vacancies may be avoided or excluded during the material synthesis and/or use.

Oxygen vacancies in the material may be characterized as a quantitatively smaller amount of oxygen atoms present in the material than expected in the parent material's crystal lattice. Oxygen vacancies are typically formed by removing an oxygen from a compound of oxygen, for example by annealing in a reducing atmosphere of $N_2$, Ar, or the like. In another embodiment, annealing may be carried out in a vacuum furnace. The oxygen vacancies may render the material non-stoichiometric or deviating from stoichiometry such that the elemental composition of the material may not be represented by a ratio of well-defined natural numbers. The material; however, may be stoichiometric.

In some applications, oxygen vacancies may be perceived as undesirable defects influencing structural, electrical, optical, dissociative and reductive properties, or other properties in a manner which is not suitable for various applications. In contrast, the materials disclosed herein have desirable properties due to oxygen vacancies being present. While a base or parent compound and a material with oxygen vacancies may have common morphology, structure, or lattice to a certain degree, their properties may significantly differ. Such is the case with the disclosed material having oxygen-deficient stoichiometry. The material has crystalline structure alike the parental $MgTi_2O_5$ phase. But even the crystalline structure differs due to the oxygen deficiencies. For example, the disclosed material's lattice may include extra bonds or lack bonds in spaces where the paternal phase includes a bond. An example of the structural differences of the parental and the disclosed material may be seen in FIG. 5. In FIG. 5, dark gray large circles represent Ti atoms, light gray large circles represent Mg, small black circles represent O atoms, and small light gray circles represent H atoms.

As can be seen in FIG. 5, the lattice of the parental $MgTi_2O_5$ phase includes Ti atoms each having precisely four bonds to an oxygen atom and Mg atoms each having either three or five bonds to an oxygen atom. In contrast, the structural lattice of $MgTi_2O_{5-\delta}$ include at least one Ti atom having bonds to five oxygen atoms and/or at least one Mg having only four bonds to oxygen atoms.

Figure 3:
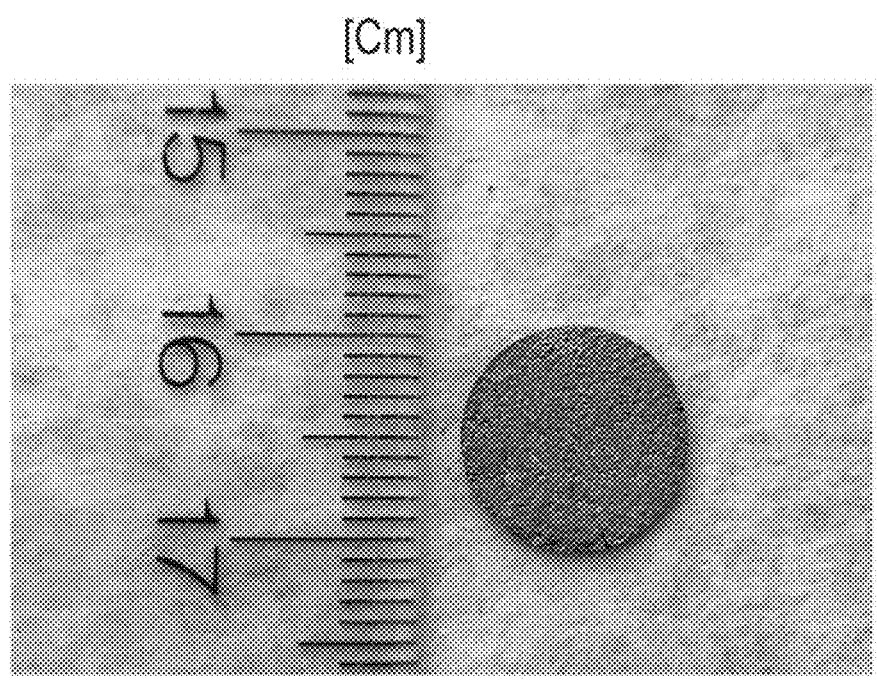
FIG. 3 shows a non-limiting example of a synthesized pellet sample of the disclosed material.

Without limiting the disclosure to a single theory, it is believed that due to presence of the oxygen vacancies, the disclosed material has very different properties than the parental phase, for example electrical conductivity as the oxygen vacancy functions as the dominant charge carrier for electrical conduction in the material. An additional difference may be observed in its physical appearance. While the parental structure is white in color, the disclosed material has a black to gray appearance with deep blue hue, indicative of the oxygen vacancies. An example of the synthesized material can be seen in FIG. 3 and the color difference, indicative of oxygen vacancies, can be seen in FIGS. 9A-9C.

The disclosed material has good electrical conductivity. The $MgTi_2O_{5-\delta}$ material may have an electrical conductivity of about 1-15, 1.5-12, or 2-10 S/m at room temperature in ambient environments. The $MgTi_2O_{5-\delta}$ material may have an electrical conductivity of about, at least about, or up to about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 10.5, 11, 11.5, 12, 12.5, 13, 13.5, 14, 14.5, or 15 S/m, or any range in between, at room temperature in ambient environments.

Electrical conductivity may be expressed via a bandgap ($E_g$), also called an energy gap. The band gap refers to the energy difference between the top of the valence band and the bottom of conduction band. Substances with large bandgaps are typically insulators, and those with smaller bandgaps are called semiconductors. Conductors either have no or zero bandgap (i.e., metallic) or very small bandgaps such as (<1 eV) (i.e., semi-metallic).

The first-principles DFT calculations were carried out to examine conductive behavior of $MgTi_2O_{5-\delta}$. The calculations were carried out within the Vienna Ab-initio Simulation Package (VASP) with projected augmented wave potentials and Perdew-Burke-Ernzerhof (PBE) formulation of the generalized gradient approximation (GGA). A plane-wave basis set cutoff energy of 520 eV was used.

Figure 4A:
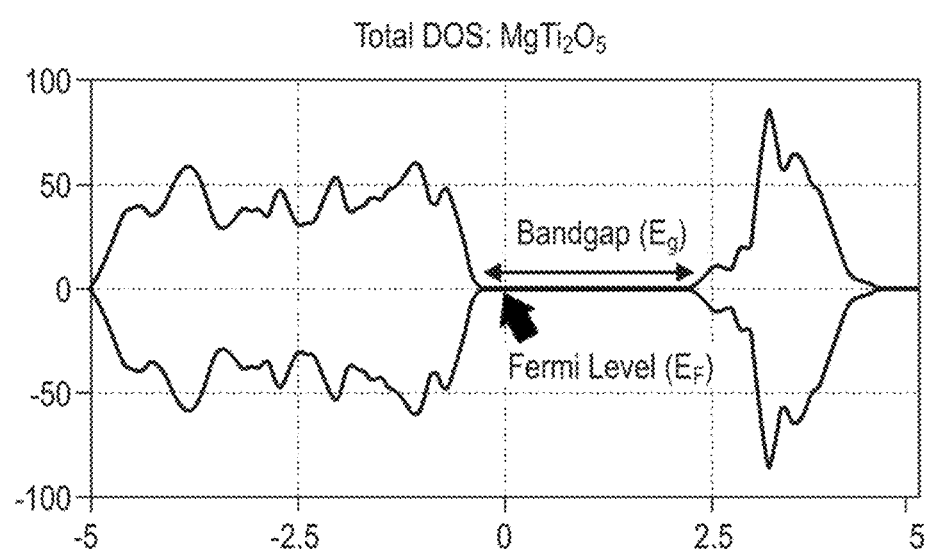
FIGS. 4A and 4B show density of state (DOS) of a MgTi$_2$O$_5$ structure indicating insulating behavior and MgTi$_2$O$_{4.92}$ indicating electrically conducting behavior, respectively.

For the atomistic simulation, the supercell of orthorhombic Cmcm $MgTi_2O_5$ (space group No. 63) with 12 formula unit was used with the k-point mesh of 3×3×3. From the density of state (DOS) simulation of FIG. 4A, it was found that the DFT bandgap of bulk-$MgTi_2O_5$ was greater than 2 eV, which indicates that the parental structure $MgTi_2O_5$ is an insulator. The Fermi level ($E_F$) was set at x=0. Below the fermi level ($E_F$) is the occupied state; and, above the fermi level is unoccupied state.

Figure 4B:
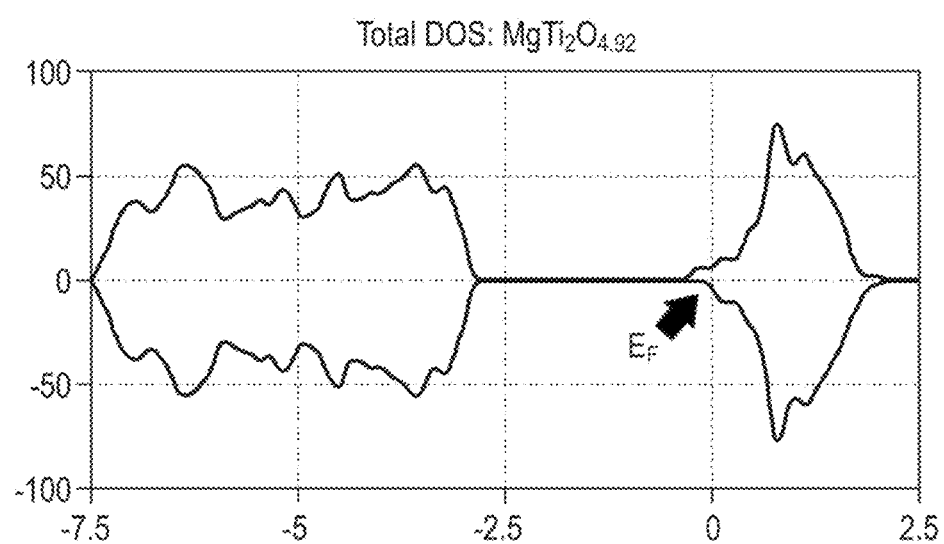

In contrast, as is shown in FIG. 4B, the presence of oxygen vacancy in the bulk $MgTi_2O_5$ structure changes the electric conductivity of the material. The Fermi level ($E_F$) of an example specimen of the disclosed material, $MgTi_2O_{4.92}$, is shifted compared to the parental structure. The $E_F$ is occupied (i.e., metallic), which indicates that $MgTi_2O_{5-\delta}$ is exhibiting its conducting behavior, which was further verified by experiments discussed below.

The DFT calculations were also utilized to assess anti-corrosive behavior of the disclosed material. DFT slab models were tested with hydrogen adsorption and dissociation reactions. Hydrogen dissociation reactions were tested on (110) $MgTi_2O_5$, (110) $MgTi_2O_{5-\delta}$, (101) $TiO_2$ (anatase), (110) $TiO_2$ (rutile), and (001) TiO structures of which are shown in FIG. 5. Each slab model was tested for maximum hydrogen coverage. Table 1 below shows the hydrogen adsorption energy ($\Delta E_{ads,H}$) and maximum hydrogen coverage ($\theta_{H,cov}$) in each slab model.

TABLE 1

Calculated Hydrogen adsorption energy ($\Delta E_{ads,H}$) and maximum hydrogen coverage ($\theta_{H,cov}$)

| | $MgTi_2O_5$ | $MgTi_2O_{5-\delta}$ | $TiO_2$ (anatase) | $TiO_2$ (rutile) | TiO |
|---|---|---|---|---|---|
| $\Delta E_{ads,H}$ [eV/H] | 0.876 | 1.159 | 1.010 | 0.960 | 1.045 |
| $\theta_{H,cov}$ [%] | 71.4 | 30.8 | 100 | 100 | 100 |

As Table 1 shows, (110) $MgTi_2O_{5-\delta}$ has the largest hydrogen adsorption energy, compared to other tested chemical species. This finding directly correlates to the highest H resistivity for (110) $MgTi_2O_{5-\delta}$ among the group of the tested species. In addition, (110) $MgTi_2O_{5-\delta}$ shows a minimum hydrogen coverage (i.e., least hydrogen dissociation).

The disclosed $MgTi_2O_{5-\delta}$ material may have a nominal chemical composition of about 25-40, 28-35, or 30-33 mol % MgO and 75-60, 72-65, or 70-66 mol % $TiO+TiO_2$ mixture. The Mg and Ti mol ratio Mg/Ti may be about 0.2-0.8, 0.3-0.60, or 0.4-0.5.

In one or more embodiments, the method of preparing the $MgTi_2O_{5-\delta}$ material is disclosed. The synthesis may include preparing dry powders of MgO, TiO, and/or $TiO_2$. The method may include forming a mixture of the MgO, TiO, and/or $TiO_2$. The method may include mixing a first powder of MgO and a second powder premixture of $TiO/TiO_2$ or TiO. The method may include drying the one or more compounds to be included in the mixture. Drying may be conducted in vacuum or ultra-high vacuum, $N_2$, Ar, or $Ar/H_2$ environment. Ultra-high vacuum refers to a regime of pressures lower than about $10^{-7}$ pascal or 100 nanopascals ($10^{-9}$ mbar, $\sim 10^{-9}$ torr).

The mixture may be compressed into any shape or configuration, for example in a mold. A non-limiting example may be compressed pellets. The compressed mixture may be heated by sintering for an amount of time. Sintering is a process of compacting and forming a solid mass of a material by heat and/or pressure without melting it to the point of liquefication or the material's melting point.

The amount of time may be an amount needed for the powder particles to fuse together and create a solid piece, and/or for the compressed material to change appearance from light gray to blue-black. The sintering may be carried out at a temperature which is below the powder mixture's melting point. The temperature may range from about 400 to 2000° C., 800 to 1800° C., or 1200 to 1500° C. in vacuum, $N_2$, Ar, or $Ar/H_2$ environment.

The amount of oxygen vacancies may be tailored depending on the needs of a specific application. The amount of oxygen vacancies may be introduced, controlled, or altered by controlling, adjusting, or controlling the sintering temperature. The amount of oxygen vacancies may be controlled by the $TiO/TiO_2$ ratio in the powder mixture. The $TiO/TiO_2$ ratio may be about 0:100, 1:99, 10:90, 20:80, 30:70, 40:80:50:50, 60:40, 70:30, 80:20, 90:10, 99:1, or 100:0.

It was surprisingly discovered that in contrast to sintering, annealing destroys oxygen vacancies in the disclosed material. Since the oxygen vacancies are desirable in the disclosed material, annealing, as a process of minimizing crystal defects through a heat treatment and involving heating a material above its recrystallization temperature, maintaining a suitable temperature for a certain amount of time, and then cooling in air, should be avoided.

The $MgTi_2O_{5-\delta}$ coating on the metal bipolar plate may be realized by different deposition techniques. A non-limiting example may involve spray coating $MgTi_2O_{5-\delta}$ containing solvents on the BPP, followed by a drying process. Alternatively, the method may involve physical or chemical vapor deposition. As yet another alternative, an atomic layer deposition (ALD) on to the metal substrate may take place. Depending on the choice of precursor, oxidizing or reducing environment, humidity, and substrate, the degree of oxygen vacancy in $MgTi_2O_{5-\delta}$ may vary, leading to different conductivity and anti-corrosion behavior. For example, under more oxidizing conditions, the surface portion of $MgTi_2O_{5-\delta}$ may be more insulating and vice versa.

The disclosed material may be used in applications requiring both corrosion resistance and good electrical conductivity. For example, the disclosed material may be used as a BPP coating, in a BPP bulk portion, in a BPP surface portion, or a combination thereof. Alternatively, the disclosed material may be used as an anticorrosive coating in automotive parts, aerospace parts, oil and gas plants, or large-scale manufacturing. In an alternative embodiment, the disclosed material may be used as a catalyst support material, for example for PEMFC applications or other catalytic application, as is further discussed below.

Examples

Set A

To verify the DFT-derived results, the disclosed material was synthesized and tested according to the methods described below.

The disclosed material was synthesized by the following method using a dry MgO, TiO and $TiO_2$ powder mixture. MgO powder was dried at 120° C. for 2 hours in Ar environment. The dried powder was then mixed with $TiO/TiO_2$ powder to form a mixture. The mixture was pressed into pellets measuring about 12 mm in diameter and 2 mm in thickness under 3000 psi uniaxial load. The as-pressed pellets had a light grey color. The compacted pellets were then loaded in a $Al_2O_3$ crucible and heated-up for reactive sintering (e.g. at 1450° C.) in vacuum environment ($10^{-3}$ torr) for 10 hours. After sintering, the pellets appeared to be black in color with a blue hue. The method was used to prepare five batches of pellets, each batch containing three to four pellets.

Five sintered pellets, one from each batch, where Au sputtered on both sides of the surface. Afterwards, the pellets were assembled in an EL-Cell® ECC cell. Constant current was applied and voltage values were recorded after about 10 min until the voltage reading stabilized. This step was repeated several times at different currents. Resistance and DC electrical conductivity was calculated by linear slope from fitting the V-I data.

FIG. 6 shows an Arrhenius plot of conductivities from 25° C. to 80° C. Average conductivity and an error bar were calculated from seven different samples made from different batches. The disclosed crystalline $MgTi_2O_{5-\delta}$ material showed an electrical conductivity of about 2-10 S/m at room temperature in ambient environments. The measured conductivity is higher than semiconductor such as Ge and Si while slightly lower than carbon, iron, and gold. The material's activation energy was about 0.13 eV in the temperature ranges between 25° C. to 80° C.

X-ray photoemission spectroscopy (XPS) and optical microscopy was used to assess physical characteristics of the disclosed material in several pellets from two different batches. For the purposes of the observation, some of the pellets were annealed. The pellets were compared to comparative pellets of $TiO_2$. The XPS studies of the pellets were performed using a PHI XPS system equipped with an Al X-ray source (incident photon energy of 1486.7 eV). The aperture size was set to about 1.1 mm in diameter. The binding energy of the obtained XPS spectra was calibrated with respect to the C 1s peak of adventitious carbon at 284.8 eV.

Figure 7:
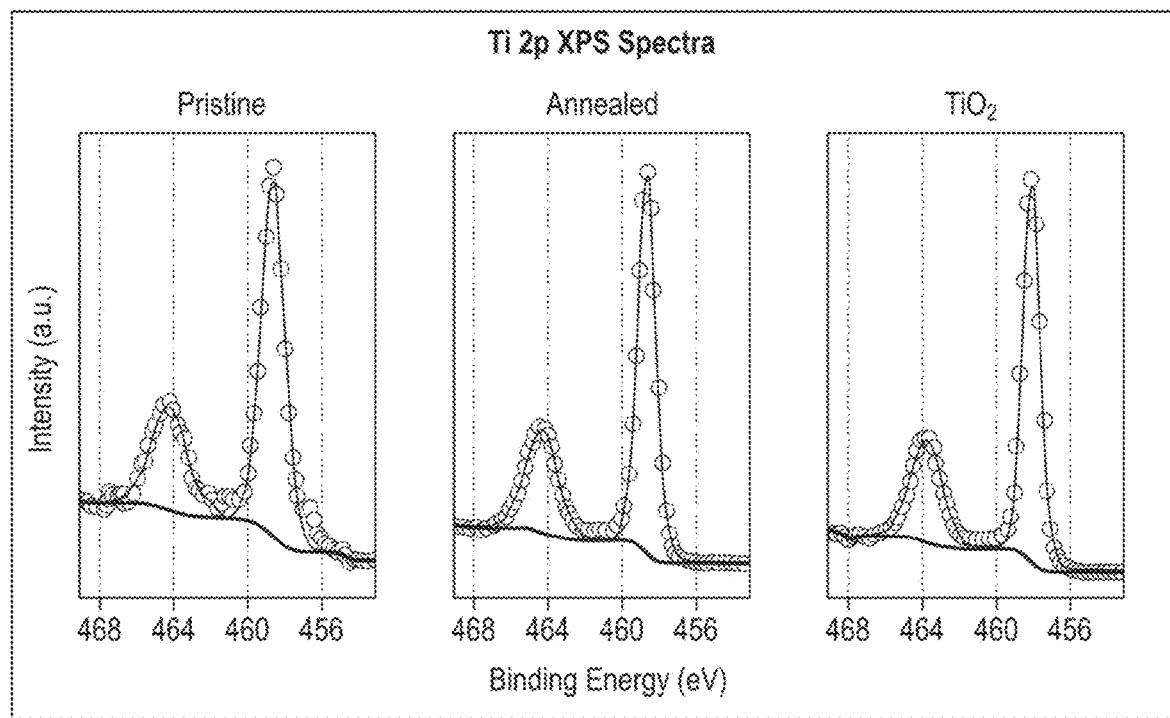
FIG. 7 shows Ti 2p X-ray photoemission spectroscopy (XPS) spectra of the pristine as-synthesized MgTi$_2$O$_{5-\delta}$, MgTi$_2$O$_{5-\delta}$ after being annealed in air, and of TiO$_2$.
Figure 8:
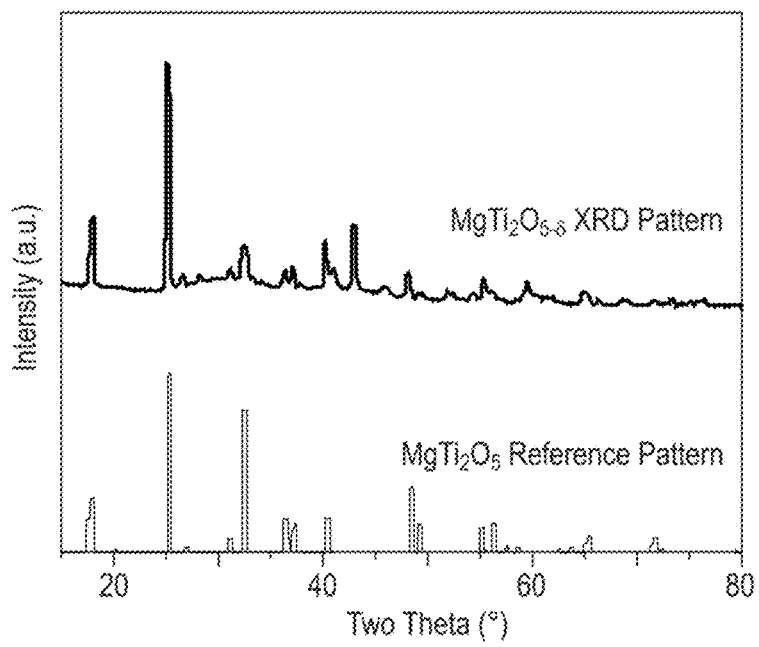
FIG. 8 is an X-ray diffraction (XRD) pattern of as synthesized MgTi$_2$O$_{5-\delta}$ versus MgTi$_2$O$_5$.

FIG. 7 shows Ti 2p XPS spectra of the pellets containing the disclosed material in its pristine state, pellets including the disclosed material annealed in air, and $TiO_2$ reference pellets. The collected data suggests that Ti in the pellets containing the disclosed material in its pristine state is dominantly Ti 4+ state, similar to Ti in the pellets including the disclosed material annealed in air and in the $TiO_2$ reference pellets. The observation and the XRD analysis also suggest that the disclosed material has a similar, but not identical, crystal structure to $MgTi_2O_5$, as can be seen in FIG. 8.

Figures 9A, 9B, 9C:
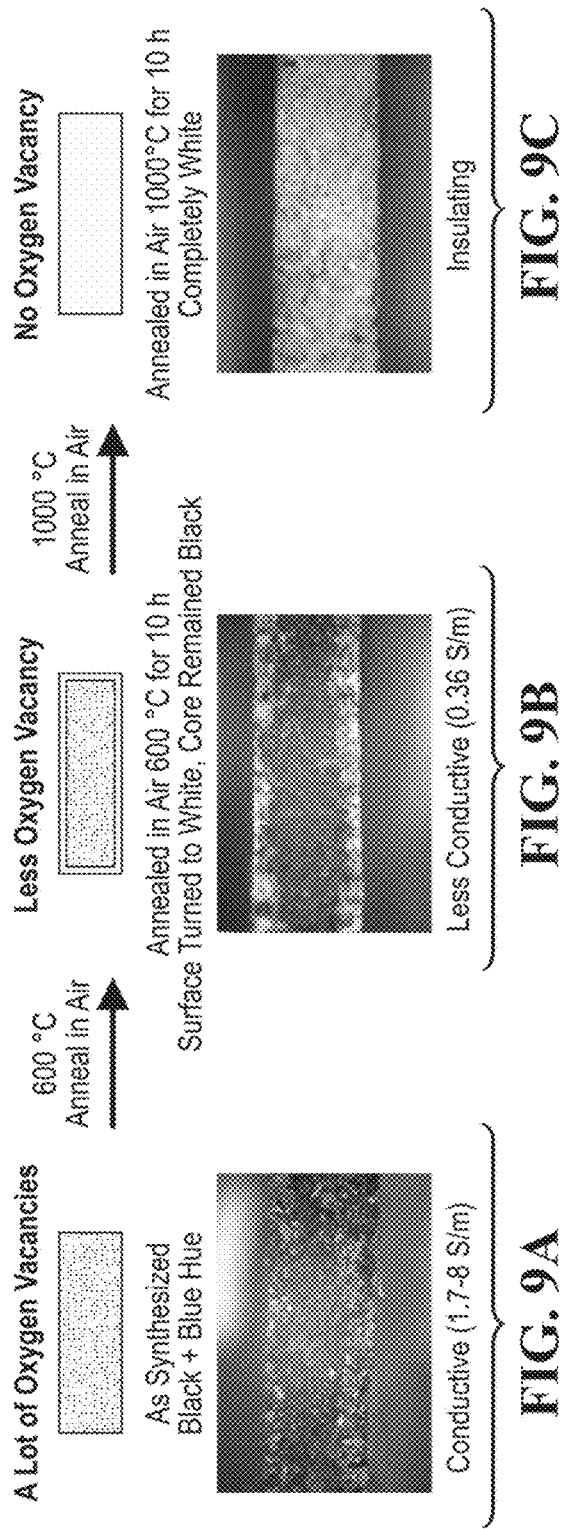
FIGS. 9A through 9C are photographs of as-synthesized MgTi$_2$O$_{5-\delta}$, MgTi$_2$O$_{5-\delta}$ after being annealed at 600° C. in air, and MgTi$_2$O$_{5-\delta}$ after being annealed at 1000° C. in air.

The sintered pellets were assessed optically. The surface of the sintered pellets can be seen in FIG. 9A, showing as synthesized pellets featuring black and blue hue on the pellet surface. Three of the sintered pellets were annealed in air at 600° C. for 10 hours. Surface of the annealed pellets changed partially at the edges of the pellets and some of the surface regions of the pellets turned white while some of the surface remained black, as can be observed in FIG. 9B. The annealed pellets were further exposed to additional annealing in air at 1000° C. for 10 hours. The entire surface of the pellets turned white after the secondary round of annealing as can be seen in FIG. 9C. Optical images of the pellets shown in FIGS. 9A-C were collected using a Keyence VHX microscope at magnifications ranging from 100× to 1000×.

Electrical conductivity was assessed for the as-synthesized pellets at about 1.7-8 S/m while the annealed pellets shown at FIG. 9B were found to be less conductive than the as-synthesized pellets at 0.36 S/m. The annealed pellets shown at FIG. 9C were assessed as insulating. The results suggest that the color and its electrical conduction are correlated to oxygen vacancies in the material. Without limiting this disclosure to a single theory, it is believed that annealing in air removes oxygen vacancies, which then leads to color change and loss of electrical conductivity. FIGS. 9A-C imply that oxygen vacancy is the main charge carrier for electrical conduction in the disclosed material. When oxygen vacancy is eliminated by the annealing process in air at 1000° C. or otherwise, the material transitions to an insulator.

The as synthesized pellets were further tested for corrosion resistance. Corrosion current measurements were carried out in a three-electrode liquid cell setup. Counter electrode was about 16 cm$^2$ Pt-mesh. The reference electrode was a standard Ag/AgCl electrode in KCl solution. Pellets were used as the working electrode with an effective area of about 0.5 cm$^2$. For each measurement, one pellet was measured at a time. In total, three pellets were measured. For static corrosion current measurement, pH=2 sulfuric acid was used as electrolyte at 60° C. Static corrosion current was recorded at 1.0 V bias vs Ag/AgCl reference electrode.

Figure 10:
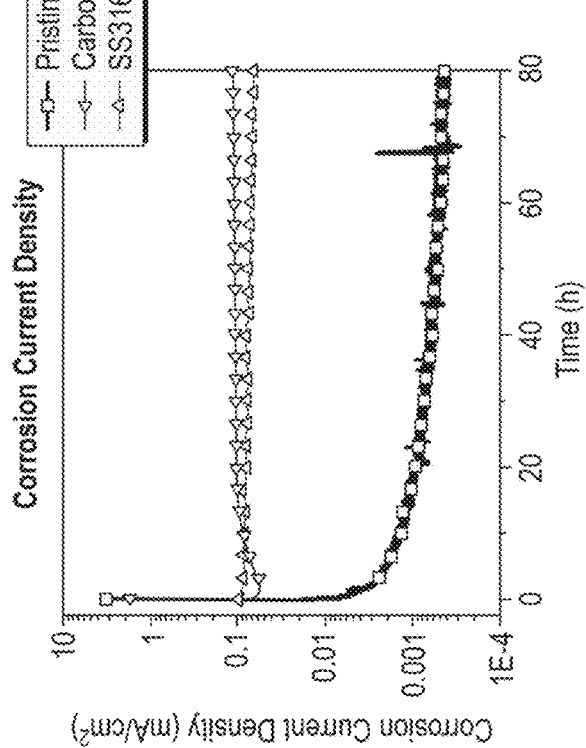
FIG. 10 shows a comparison plot of corrosion current density of pristine MgTi$_2$O$_{5-\delta}$, carbon paper, and polished stainless steel (SS) 316.

The results of the corrosion current measurements are shown in FIG. 10. Corrosion current density for the as-synthesized, pristine disclosed material is shown on the bottom, carbon paper on top, and polished stainless steel (SS) 316 in the middle. The pristine $MgTi_2O_{5-\delta}$ material's corrosion current density was assessed to be about two orders of magnitude better/lower than the polished SS316 and carbon paper. In other words, corrosion current measured in $MgTi_2O_{5-\delta}$ showed that the $MgTi_2O_{5-\delta}$ produces ×100 times smaller steady corrosion current when compared to SS316. Overall, the crystalline $MgTi_2O_{5-\delta}$ material demonstrated good corrosion resistance in acidic environment.

The $MgTi_2O_{5-\delta}$ material may have corrosion resistance (static corrosion current density) of less than about 0.5-5, 1-3, or 1.5-2.5 $\mu A\ cm^{-2}$ at pH of 2 at a temperature of about 0 to 80° C., 10 to 60° C., or 20 to 40° C. The $MgTi_2O_{5-\delta}$ material may have corrosion resistance of less than about 5.0, 4.0, 3.0, 2.5, 2.0, 1.8, 1.6, 1.4, 1.2, 1.0, 0.9, 0.8, 0.7, 0.6, 0.5, 0.4, 0.3, 0.2, or 0.1 $\mu A\ cm^{-2}$ at pH of 2 at a temperature of about 0 to 80° C., 10 to 60° C., or 20 to 40° C.

The pellets were also tested for chemical resistivity or inertness. Chemical inertness relates to the material's reactivity with compounds present in the acidic fuel cell environment such as $H_3O^+$, $F^-$, and $SO_4^-$. One pristine pellet was crushed into powder, which was tested in Aqua Regia (concentrated $HNO_3$ and HCl mixture with 3:1 ratio) heated to 100-150° C. The powder did not dissolve, which indicated good chemical stability.

In one or more non-limiting embodiments, the disclosed material may be used as a catalyst support in the PEMFC. In a PEMFC, an anode and a cathode each may include a catalyst facilitating the reactions of oxygen and hydrogen. The anode catalyst oxidizes the fuel into the hydrogen protons and electrons at the anode while the cathode catalyst catalyzes oxygen reduction reaction which results in formation of water. Due to a more complicated chemistry at the cathode, a higher loading of a catalyst is usually needed at the cathode than at the anode to increase the reaction speed.

A suitable catalyst must be stable enough to withstand the corrosive environment at the cathode as well as sufficiently chemically active to be able to reduce $O_2$. The catalyst must be also selective enough to produce the desired product while minimizing production of undesirable intermediates. The catalyst layer should be also capable of facilitating release of product water from the catalyst surface to free up catalytic sites once the reaction is complete.

A variety of noble metals have been used as a catalyst. The most commonly-used catalyst is platinum (Pt) due to its excellent catalytic activity and moderate stability to withstand its harsh operating condition. Indeed, Pt is one of the few elements capable of withstanding the acidic (PH<2) operation environment of the fuel cell.

Typically, to increase stability of the catalysts and to prevent their physical detachment from the system, the catalyst materials are typically affixed to catalyst support materials, which are typically solid materials with a high surface area. The catalyst support itself needs to be inert to prevent affecting the catalytic reactions. The most common catalyst supports for PEMFC include graphite, carbon nanofibers, carbon nanotubes, nanospheres, nanoellipsoids, nanorods, the like, or a combination thereof.

Yet, oxidation of these support materials under the fuel cell operating conditions may occur, especially during the start-up/shutdown processes, which may in turn lead to degradation of the catalyst which may be limiting the PEMFC lifetime of PEMFC. For carbon-base supports, the phenomenon is known as carbon corrosion. Therefore, various metal oxides have been studied as a possible alternative catalyst support, as opposed to carbon, due to their tendency to improve the catalyst stability and resistance against further oxidation.

Any catalyst support material needs to meet certain criteria—to be stable in the PEMFC operating conditions, which is usually acidic (i.e., low pH, from pH 1 to 4), and to withstand different voltages which are being applied to the fuel cell (typically, 0 V up to ~1.2 V vs. SHE).

Among different metal oxides to be used as catalyst support materials in a PEMFC electrode, $TiO_2$ and $SnO_2$ have been disclosed as leading candidates. This is due to their stability in the aqueous electrochemical system for $TiO_2$ and $SnO_2$: forming a stable oxide where pH can vary from 1 to 4 (i.e., acidic) and voltages between 0 to 1.23 V can also affect the local environment during the PEMFC operation. Recently, Sn-doped $TiO_2$ was also tested as a catalyst support material for Pt catalyst and reported the following: 1) doping up to 10% Sn in $TiO_2$ resulted in an increase in the mass activity; 2) catalyst support with 23 to 40% Sn doping in $TiO_2$ required much less platinum; and, 3) Sn-doped $TiO_2$ was stable in the acidic conditions at 80° C. at <28% doping of Sn in $TiO_2$.

In one or more embodiments, the materials disclosed herein of formula (I) may be used as a metal oxide support for a PEMFC catalyst in the fuel cell application, on a cathode, anode, or both. The catalyst may be a noble metal or noble-metal free catalyst. A non-limiting example of a catalyst may be Pt, Pd, Au, Ir, Rh, Ru, or a combination thereof. The catalyst may be an oxidation reduction reaction (ORR) catalyst.

The catalyst may be deposited onto the $MgTi_2O_{5-\delta}$ metal oxide material either forming one or more island(s) of catalyst on the catalyst support, as is shown in FIG. 11A or in a core-shell-type configuration, $MgTi_2O_{5-\delta}$ forming the core and the catalyst forming the shell, as is depicted in FIG. 11B. In FIGS. 11A and 11B, 50 denotes the catalyst support and 52 denotes the catalyst. A specific configuration may be tailored depending on the expected performance, cost, and lifetime of the PEMFC device and/or stack system. Scanning electron microscope (SEM) cross-section images of $MgTi_2O_{5-\delta}$ serving as a catalyst support material and Pt used as a catalyst are shown in FIGS. 12A and 12B. The catalyst support material may have even or uneven surface. The catalyst support material may serve as a substrate for the catalyst material. The catalyst support material may physically and/or chemically bind the catalyst.

The catalyst support material including $MgTi_2O_{5-\delta}$ is chemically stable in acidic environment and has high electrochemical stability against corrosion and oxidation environments during fuel cell operation conditions, as is demonstrated herein.

DFT calculations were performed to construct the interface between a Pt metal catalyst and $MgTi_2O_{5-\delta}$. DFT calculations were carried out within the Vienna Ab-initio Simulation Package (VASP) with projected augmented wave potentials and Perdew-Burke-Ernzerhof (PBE) formulation of the generalized gradient approximation (GGA). A plane-wave basis set cutoff energy of 520 eV was used. The DFT calculations were used to verify that Pt and $MgTi_2O_{5-\delta}$ may form a stable interface, which may enable utilization of $MgTi_2O_{5-\delta}$ as an oxide support material for a PEMFC catalyst.

Table 2 below shows the DFT-calculated interfacial energy between a Pt catalyst and $MgTi_2O_{5-\delta}$ support. Specifically, energetically-stable Pt surface facets (111), (100), and (110) were examined on the (110) $MgTi_2O_{5-\delta}$. Table 2 illustrates that the calculated DFT interfacial energies between (110) $MgTi_2O_{5-\delta}$ and Pt catalyst (regardless of the facets) are predicted to be a negative value. A negative DFT interfacial energy indicates that two chemical systems will form a stable interface. Table 2 further shows DFT interfacial energies of Pt on $TiO_2$ and $SnO_2$ for comparison. As can be seen in Table 2, the interfacial energy for $MgTi_2O_{5-\delta}$ and $SnO_2/TiO_2$ are comparable. For the DFT calculations, $\Delta E_{int} = E_{0,total} - (E_{0,Pt,surf} + E_{0,MOx})$, where the internal energy ($E_0$) may be obtained from the DFT calculations.

TABLE 2

Calculated DFT interfacial energy ($\Delta E_{int}$) between a Pt catalyst and various oxide support materials

| DFT interface between Pt surface and an oxide support material | $\Delta E_{int}$ [J/m²] | FIG. |
|---|---|---|
| (111) Pt ∥ (110) $MgTi_2O_{5-\delta}$ | −1.83 | 13B, 13E |
| (100) Pt ∥ (110) $MgTi_2O_{5-\delta}$ | −2.01 | 13A, 13D |
| (110) Pt ∥ (110) $MgTi_2O_{5-\delta}$ | −1.35 | 13C, 13F |
| (111) Pt ∥ (101) $TiO_2$ (Anatase) | −1.48 | — |
| (111) Pt ∥ (110) $SnO_2$ (Rutile) | −1.93 | — |

Figure 13A:
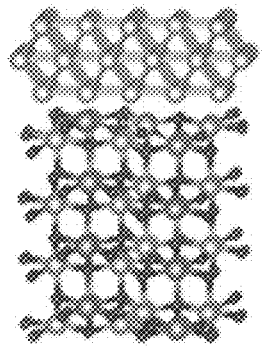
FIGS. 13A through 13F show first-principles density functional theory (DFT)-constructed interfaces before and after DFT relaxation between MgTi$_2$O$_{5-\delta}$ and Pt surfaces.
Figure 13B:
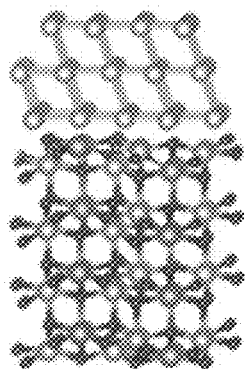
Figure 13C:
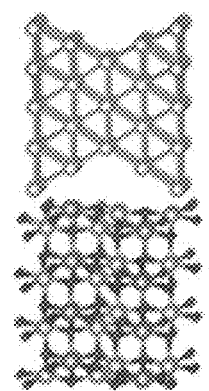
Figure 13D:
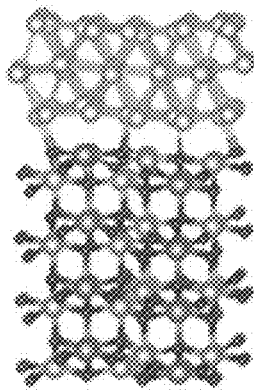
Figure 13E:
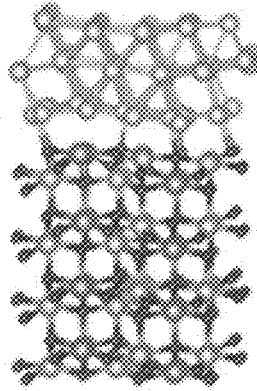
Figure 13F:
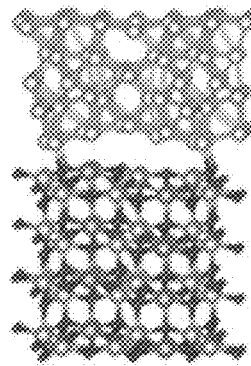

FIGS. 13A-F show the constructed interfaces between various Pt surface facets and (110) $MgTi_2O_{5-\delta}$ before and after the DFT relaxation calculations. Specifically, FIGS. 13A-C show the constructed interfaces before DFT relaxation, FIGS. 13D-F show the interfaces after DFT relaxation. It is apparent from FIGS. 13D-F that after the DFT relaxation, Pt(100) and Pt(111) on $MgTi_2O_{5-\delta}$ look very similar to each other.

Figure 14:
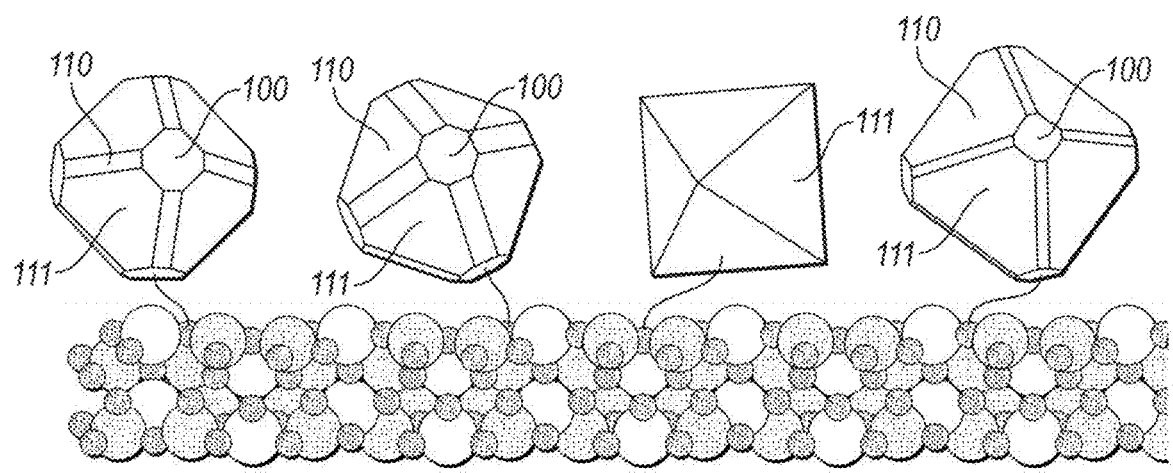
FIG. 14 shows schematic depictions of various Pt particles/facets attached to MgTi$_2$O$_{5-\delta}$ oxide support.

Table 1 further shows that (100) Pt may bind most strongly on (110) $MgTi_2O_{5-\delta}$, while (110) Pt may bind less strongly on (110) $MgTi_2O_{5-\delta}$. While the (111) facet seems to be the most energetically favored surface facet in Pt nanoparticles, (110) and (100) are also observed at the corner and edge of the Pt particles. Depending on the synthesis temperature, time, pH, precursor materials, and route, it is possible to control the size and shape of Pt nanoparticles, as shown in FIG. 14. Table 2 indicates that all Pt facets bind on $MgTi_2O_{5-\delta}$; (100) and (111) facets may bind more strongly than (110). Thus, regardless of the size and shape of the Pt catalyst particles, DFT calculations suggest that a stable interface between the Pt catalyst and $MgTi_2O_{5-\delta}$ will form.

Conductive and anti-corrosive behavior of the disclosed material as a catalyst support was further investigated. Table 3 below shows DFT binding energies ($\Delta E_b$) of $H_2O$ and $H_3O$ on Pt supported by various metal oxide supports. Relative binding energies ($\Delta E_{rel,b}$) are also provided, where the binding energies on pure Pt (111) are used as the reference (i.e., zero energy). The calculated binding energies of $H_2O$ and $H_3O$ of Pt supported on $MgTi_2O_{5-\delta}$ are between Pt supported on $SnO_2$ and $TiO_2$. This indicates that Pt on $MgTi_2O_{5-\delta}$ may provide more stability than Pt supported on $SnO_2$ while it can provide more reactivity compared to Pt supported on $TiO_2$.

TABLE 3

DFT binding energies ($\Delta E_b$) of $H_2O$ and $H_3O$ on Pt supported by various metal oxide supports

| DFT interface between Pt surface and an oxide support material | $\Delta E_{b,H2O}$ [eV] | $\Delta E_{relb,H2O}$ [eV] | $\Delta E_{b,H3O}$ [eV] | $\Delta E_{relb,H3O}$ [eV] |
|---|---|---|---|---|
| (111) Pt ∥ (110) $MgTi_2O_{5-\delta}$ | −0.311 | −0.157 | −0.634 | −0.227 |
| (100) Pt ∥ (110) $MgTi_2O_{5-\delta}$ | −0.217 | −0.063 | −0.588 | −0.181 |
| (110) Pt ∥ (110) $MgTi_2O_{5-\delta}$ | −0.309 | −0.155 | −0.497 | −0.090 |
| (111) Pt ∥ (101) $TiO_2$ (Anatase) | −0.080 | +0.074 | −0.349 | +0.058 |
| (111) Pt ∥ (110) $SnO_2$ (Rutile) | −0.492 | −0.338 | −0.837 | −0.430 |
| Pure (111) Pt | −0.154 | — | −0.407 | — |

As can be seen in Table 3, the relative binding energies of $H_2O$ for Pt on $MgTi_2O_{5-\delta}$ range between −0.063 and −0.157 eV. For the case of $H_3O$, the binding energies vary from −0.090 eV to −0.027 eV. For both of these cases, the binding energies are lower than Pt supported on $TiO_2$, while higher than Pt supported on $SnO_2$. Thus, as was stated above, Pt on $MgTi_2O_{5-x}$ may have more "stability" against the reactant than Pt supported on $SnO_2$ and may have more "reactivity" than Pt on $TiO_2$. Additionally, the $MgTi_2O_{5-\delta}$ material's anti-corrosive behavior and enhanced electronic conductivity discussed above and referenced in FIGS. 6 and 10, respectively, provides an additional advantage for the $MgTi_2O_{5-\delta}$ material to be used as a catalyst support over the current state-of-the-art $TiO_2$ and $SnO_2$ catalyst support systems.

The $MgTi_2O_{5-\delta}$ catalyst support materials may be prepared by a variety of methods including, but not limited to a solution-based process, a solid-state process, a heat-treatment, and/or electrochemical methods. The catalyst support material may be un-doped, and/or doped partially with nitrogen, carbon, fluorine, the like, or other elements to further enhance electronic conductivities. Non-limiting examples of other elements may include other $d^0$ metals such as $Zr^{4+}$, $Hf^{4+}$, $V^{5+}$, and/or $Cr^{6+}$, and/or $d^{10}$ metals such as $Zn^{2+}$, $Ga^{3+}$, and/or $Pb^{4+}$, as well as $Al^{3+}$ (no d electrons), where $d^0$ and $d^{10}$ metals and $Al^{3+}$ are typically more difficult to be oxidized.

A non-limiting example preparation method may include dissolving metal-containing precursor chemicals such as $M(NO_3)_x$, $MCl_x$, $M(OH)_x$, and $MO_x$, where M=Mg and Ti in a solvent to form an initial mixture. The solvent may be water or an organic solvent. The pH of the solution may be adjusted, maintained, or controlled by the presence of oxidizing or reducing chemicals. The initial mixture may be heat-treated between about 100 to 2000° C., 200 to 1500° C., or 300 to 1000° C. with a various aging time of about 1, 2, 3, 4, 8, 12, 16, 24, 36, 48, 60, or 72 hours to form the catalyst support material. During the heat treatment, the gas environment may be controlled by $N_2$, Ar, $H_2$, $O_2$, air, and/or vacuum. A catalyst material such as Pt may be deposited on the catalyst support material afterwards, either using solid-state, solution-based method, and/or various deposition techniques.

Various size of oxide precursor materials such as MgO, TiO, $TiO_2$, $Mg(OH)_2$, or the like may be mixed and synthesized via a solid-state method such as a ball-milling process, followed by a secondary heat treatment.

The $MgTi_2O_{5-\delta}$ catalyst supports may be prepared into high surface area particles by a hydrothermal method followed by a subsequent annealing process in an oxygen-free atmosphere. The non-limiting example BET of the $MgTi_2O_{5-\delta}$ catalyst support may be about 100 to 1500, 150 to 850, or 200 to 550 $m^2/g$. The non-limiting example BET of the $MgTi_2O_{5-\delta}$ catalyst support may be about, at least about, or up to about 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 $m^2/g$ or any range in between. In comparison, Vulcan XC-72 material typically has BET specific area of 250 $m^2/g$; high surface area carbons may have the BET specific area of up to about 1,500 $m^2/g$: e.g., Ketjen Black EC 600JD, Ultra High Surface Area Carbon (USAC), and so on.

Another non-limiting example BET area of the $MgTi_2O_{5-\delta}$ catalyst support may be below 100 $m^2/g$ such as 0.1 to 99, 1 to 50, or 5 to 25 $m^2/g$. The BET area of the $MgTi_2O_{5-\delta}$ catalyst support may be about, at least about, or up to about 0.1, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.5, 6.0, 6.5, 7.0, 7.5, 8.0, 8.5, 9.0, 9.5, 10, 11, 12, 13, 14, 15, 16, 17, 18, 19, 20, 22, 24, 26, 28, 30, 32, 34, 36, 38, 40, 42, 44, 46, 48, 50, 55, 60, 65, 70, 75, 80, 85, 90, 95, or 99 $m^2/g$ or any range in between.

Alternatively, the $MgTi_2O_{5-\delta}$ catalyst support material may be prepared by a chemical reaction under a relatively high temperature of about 400 to 2000° C., 800 to 1800° C., or 1200 to 1500° C. in vacuum, $N_2$, Ar, or $Ar/H_2$ environment followed by mechanical milling. The preparation atmosphere should be kept free of oxygen such that oxygen is not supplied during the reaction and is actively removed from the reaction environment. $MgTi_2O_{5-\delta}$ catalyst supports may be prepared by a colloidal synthesis route followed by subsequent annealing steps in varying atmosphere. The catalyst support may be prepared by a combustion synthesis or flame synthesize method followed by subsequent annealing steps in an oxygen-free environment.

The disclosed material may be used for catalysis in a variety of applications including PEMFC, anion exchange membrane fuel cell (AEMFC), either at the cathode or the anode, proton exchange membrane electrolyzer, chemical synthesis, air purification including purifying exhaust from an internal combustion engine, photo-catalysis for water splitting cells, or photo-catalysis of redox media for water cleaning.

The $MgTi_2O_{5-\delta}$ catalyst support material may be further mixed with carbon and/or another type of conductive polymer to increase conductivity. Carbon includes, but is not limited to, amorphous carbon, Denka black, Ketjen black, acetylene black, carbon nanotube, carbon fibers, graphene, graphite, graphyne, graphene oxide, reduced graphene oxide, etc. The ratio of the mixture may be about 1:1, 1:2, 1:3, 1:4, 1:5, 1:6, 1:7, 1:8, 1:9, 1:10, 10:1, 9:1, 8:1, 7:1, 6:1, 5:1, 4:1, 3:1, or 2:1. Alternatively, carbon and/or another type of additional support material may form one or more additional sublayers, serving as a support for the disclosed material.

The $MgTi_2O_{5-x}$ catalyst support material may be mixed with one or more types of catalyst support materials such as oxide, carbides, or intermetallic compounds. Example oxide materials may include $SnO_2$, $MoO_3$, $Nb_2O_5$, $Ta_2O_5$, $TiO_2$, $WO_3$, $SnMo_4O_6$, and/or $TiNb_3O_6$, $GeO_2$, $MoO_2$, $NbO_2$, SnO, $Ti_3O_5$, $SnWO_4$, $WO_2$, $Nb_2SnO_6$, $Sn_2WO_5$, $SnGeO_3$, $Ta_2SnO_6$, $TiSn_2O_4$, $Ti_6O$, or mixtures thereof. Example carbides may include $Nb_6C_5$, $Mo_2C$, $Ta_2C$, $Ti_8C_5$, WC, TaC, $Nb_2SnC$, $Ti_2GeC$, $Ti_3SnC_2$, $Ti_3GeC_2$, MoC, or mixtures thereof. Non-limiting examples of binary or ternary intermetallic compounds may be MoW, $NbSn_2$, $Nb_3Sn$, $Sn_2Mo$, $TaSn_2$, $Ta_3Sn$, $TaW_3$, TiMo, $TiMo_3$, $Ti_2Mo$, $Ti_3Mo$, TiNb, $Ti_2Sn$, $Ti_3Sn_3$, $Ti_3Sn$, $Ti_6Sn_5$, $NbMo_2W$, $TaMo_2W$, $TiMo_2W$, $Ti_2NbSn$, $GeMo_3$, $Ge_2Mo$, $NbGe_2$, $Nb_5Ge_3$, SnGe, $TaGe_2$, $Ta_3Ge$, $Ta_5Ge_3$, $TiGe_2$, $Ti_5Ge_3$, $Ti_6Ge_5$, or mixtures thereof. Depending on the secondary heat-treatment conditions such as temperature, presence of oxidizing/reducing agents, the amount of oxides (as well as their compositions) in the surface film and bulk region of the intermetallic component may be further controlled.

Examples

Set B

To validate the DFT-calculated results, the disclosed material was used to form pellets by a method described under EXAMPLES, Set A above. Subsequently, a catalyst material including Pt was sputtered onto the pellets, and the catalyst support with the catalyst were exposed to annealing at 600° C. for 10 hours. FIG. 12A shows an example of one of the pellets including the sputtered catalyst before the annealing process. FIG. 12B shows one of the pellets after the annealing process. The dashed line indicates the interface between Pt and $MgTi_2O_{5-\delta}$ in both FIGS. 12A and B. FIGS. 12A and 12B are scanning electron microscope (SEM) cross-section images. FIG. 12B shows that the Pt catalyst bonded very well on the $MgTi_2O_{5-\delta}$ support surface. No phase separation was observed. The experiment showed that Pt formed a good contact with the $MgTi_2O_{5-\delta}$ material. Even after the heat treatment of 600° C. for 10 hours, Pt remained in intimate contact with the $MgTi_2O_{5-\delta}$ material surface, suggesting a good contact.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The following application is related to the present application: U.S. patent application Ser. No. 16/675,564, filed on Nov. 6, 2019, which is incorporated by reference in its entirety herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell bipolar plate comprising:
   a metal substrate having:
      a bulk portion; and
      a surface portion comprising an anticorrosive, conductive, non-stoichiometric material having oxygen vacancies and a formula (I):

$$MgTi_2O_{5-\delta} \qquad (I),$$

where $_\delta$ is a number between 0 and 3 including a fractional part denoting the oxygen vacancies, the non-stoichiometric material having an electronic conductivity of about 2-10 S/m at room temperature in an ambient environment.

2. The bipolar plate of claim 1, wherein a static corrosion current density of the bipolar plate is less than about 1 μA cm$^{-2}$ at pH of 2 at a temperature of about 0 to 80° C.

3. The bipolar plate of claim 1, wherein an Mg/Ti ratio of the material is a number in a range between 0.3 to 0.6.

4. The bipolar plate of claim 1, wherein the material has an activation energy of about 0.13 eV in a temperature range between 25° C. to 80° C.

5. The bipolar plate of claim 1, wherein the material has a crystalline structure.

6. The bipolar plate of claim 5, wherein the structure includes at least one Ti atom with five bonds to oxygen atoms.

7. A proton-exchange-membrane fuel cell bipolar plate comprising:
   a metal substrate having a bulk portion and a surface portion either one of which includes an anticorrosive, conductive non-stoichiometric material having oxygen vacancies and a formula (I):

$$MgTi_2O_{5-\delta} \qquad (I),$$

where $_\delta$ is a number between 0 and 3 including a fractional part and denoting oxygen vacancies,
the non-stoichiometric material having a nominal chemical composition of about 33 mol % MgO and 66 mol % of a mixture of TiO and TiO$_2$.

8. The bipolar plate of claim 7, wherein an Mg/Ti ratio is a number in a range between 0.3 to 0.6.

9. The bipolar plate of claim 7, wherein a static corrosion current density of the bipolar plate is less than about 1 μA cm$^{-2}$ at pH of 2 at a temperature of about 0 to 80° C.

10. The bipolar plate of claim 7, wherein the material has an activation energy of about 0.13 eV in a temperature range between 25° C. to 80° C.

11. The bipolar plate of claim 7, wherein the bulk portion comprises the material.

12. A fuel cell comprising:
   a bipolar plate having a metal substrate including a bulk portion and a surface portion comprising an anticorrosive, conductive material having oxygen vacancies and a formula (I):

$$MgTi_2O_{5-\delta} \qquad (I),$$

where
$_\delta$ is any number between 0 and 3 including the fractional part denoting the oxygen vacancies,
the material having an electronic conductivity of about 2-10 S/m at room temperature in ambient environment.

13. The fuel cell of claim 12, wherein static corrosion current density of the bipolar plate is less than about 1 μA cm$^{-2}$ at pH of 2 at a temperature of about 0 to 80° C.

14. The fuel cell of claim 12, wherein an Mg/Ti ratio of the material is a number in a range between 0.3 to 0.6.

15. The fuel cell of claim 12, wherein the fuel cell is an anion exchange membrane fuel cell (AEMFC).

* * * * *

UNITED STATES PATENT AND TRADEMARK OFFICE
CERTIFICATE OF CORRECTION

| | |
|---|---|
| PATENT NO. | : 11,316,171 B2 |
| APPLICATION NO. | : 16/675538 |
| DATED | : April 26, 2022 |
| INVENTOR(S) | : Lei Cheng et al. |

It is certified that error appears in the above-identified patent and that said Letters Patent is hereby corrected as shown below:

In the Claims

Column 18, Lines 14-15, Claim 7:
After "one of which includes an anticorrosive,"
Delete "conductive"
Insert -- conductive, --.

Signed and Sealed this
Eleventh Day of April, 2023

Katherine Kelly Vidal
*Director of the United States Patent and Trademark Office*